United States Patent [19]
Olix

[11] 3,767,440
[45] Oct. 23, 1973

[54] DEXTRIN-CLAY-SILICATE ADHESIVE

[75] Inventor: Donald J. Olix, Fairport Harbor, Ohio

[73] Assignee: Diamond Shamrock Corporation, Cleveland, Ohio

[22] Filed: Apr. 24, 1972

[21] Appl. No.: 246,718

[52] U.S. Cl. .................................. 106/214, 106/80
[51] Int. Cl. ...................... C08b 25/02, C08b 27/06
[58] Field of Search ...................... 106/214, 80, 84

[56] References Cited
UNITED STATES PATENTS

| | | | |
|---|---|---|---|
| 3,433,691 | 3/1969 | Reese | 106/80 X |
| 2,232,162 | 2/1941 | Boller | 106/84 |
| 2,772,996 | 12/1956 | Sams | 106/80 |
| 2,212,557 | 8/1940 | Bauer | 106/209 |
| 3,262,793 | 7/1966 | Neely | 106/55 |

OTHER PUBLICATIONS
Chem. Abst. 53: 14513f 1959.

Primary Examiner—Theodore Morris
Attorney—Roy Davis

[57] ABSTRACT

An adhesive composition in the form of a stable dispersion, and comprising of a mixture of about 80–92 percent of an aqueous alkali metal silicate, about 1.5–6 percent dextrin or modified dextrin, and about 4.5–12 percent of a clay slurry. The clay slurry is formed by blending from about 0.25 to about 1.0 parts of a swelling type clay, from 0 to about 1.0 parts by weight of a kaolin type clay, and 6 parts by weight of water. The novel compositions are prepared by heating a mixture of the alkali metal silicate and the clay slurry to a temperature of about 160°F., then adding the dextrin and maintaining the mixture at about 160°F. for a period of at least 10 minutes after all of the dextrin has been added. The novel compositions may also contain additional kaolin type clay and/or a small amount of starch, as well as stabilizers and viscosity control agents of the type well known to those skilled in the art.

2 Claims, No Drawings

DEXTRIN-CLAY-SILICATE ADHESIVE

BACKGROUND OF THE INVENTION

This invention relates to novel water-based adhesives, and more particularly to certain dextrin-clay-silicate adhesives and the method of their preparation.

Aqueous alkali metal silicates, particularly sodium silicates, have been used for years as adhesives for solid fiber and corrugated boxes, in cartons and the like, and in other fields such as plywood manufacture. They are extremely versatile adhesives, combining convenience of use with strength and rigidity. Unfortunately, however, adhesives of this type usually take from about 30 to about 60 seconds to develop initial "tack."

The time period required to develop tack has severely limited the use of silicate adhesives in many applications. In particular mention may be made of the manufacturing of laminated paper tubes, where it is essential that sufficient "tack" be developed before the plies leave the mandrel on a spiral winder. Since this occurs only seconds before the tube is cut by a rotary saw, any failure of the adhesive to fully develop the requisite tack causes a complete breakdown of the manufacturing process.

On the other hand, dextrin and modified dextrins have also been used for years as adhesives for various applications, including many in the paper industry. Dextrin type adhesives are particularly known for the speed with which they develop initial tack, usually less than one-third of the time required for silicate based adhesives. These dextrin based materials, however, do not have the strength and rigidity long associated with the silicate type adhesives, and these properties are important to applications such as tube winding.

It is, of course, clear that an adhesive having the strength and the cure characteristics of the silicate based adhesives, and also the so-called fast initial tack of dextrin based adhesives, is very much to be desired. In fact, a number of attempts have been made to prepare such adhesive compositions, by adding dextrine to a silicate adhesive, but with only limited success.

It was generally found that unless the composition contained more than about 1.0 percent dextrin, the tack would not develop any faster than with normal silicate adhesives. On the other hand, when the composition contained more than 0.5 percent dextrin, the dextrin quickly "floated out," rising to the surface of the adhesive composition. Floating out while in storage is a distinct disadvantage since it requires additional mixing steps just prior to each use. The most serious drawback caused by this problem, however, is when the floating out occurs after the adhesive has been added to a complex mechanical dispensing device, particularly the dispensing mechanisms of large box and paper forming machinery, such as that employed in producing paper tubes. In such cases the first sign of any problem is almost always a failure of the article being sealed, and/or clogging of the dispensing apparatus.

One example of the prior attempts to produce dextrin-silicate adhesives is the composition disclosed in U. S. Pat. No. 3,433,691 to William D. Reese. There the adhesive composition consisted essentially of 80–90 percent aqueous alkali metal silicates and from 4–10 percent borated dextrin with the remainder being water. While this composition, proved to be an excellent adhesive in certain applications when tested on a laboratory scale, it was subsequently found to be somewhat difficult to handle in larger quantities, and in commercial applications, because of floating out of the dextrin. Significantly objectionable floating out of the dextrin was generally encountered in less than a few hours after mixing.

Similarly, U. S. Pat. No. 2,232,162 discloses certain alkali metal silicate-clay adhesives. These adhesives involve what the patentee describes as "china clay" which is, of course, a kaolin type clay. As will be seen from the results of the experiments described in more detail in the example hereinafter, kaolin clay by itself is not suitable for use in preparing the compositions of the present invention, other than as a purely optional additional compounding ingredient.

SUMMARY OF THE INVENTION

The novel adhesive compositions of the present invention compose a mixture of about 80–92 percent of an aqueous alkali metal silicate, about 1.5–6 percent dextrin or modified dextrin, about 4.5–12 percent of a clay slurry. The clay slurry is formed by blending from about 0.25 to about 1.0 parts of a swelling type clay, from 0 to about 1.0 parts by weight of a kaolin type clay and 6 parts by weight of water. Suitable swelling type clays include by way of illustration and not by way of limitation, bentonite, attapulgite, illite, beidellite, and the like.

The novel compositions of the present invention are prepared by heating a mixture of the alkali metal silicate and the clay slurry to a temperature of about 160°F. for a period of at least 10 minutes, after all of the dextrin has been added. This method of preparation is considered quite critical.

It is essential that the swelling type clay is employed, that it is mixed with the water, and that it is allowed to complete a substantial portion of its swelling (at lease 50 percent) prior to addition of the clay to the liquid silicate. The degree of swelling is a function of time, and/or the shear and duration of the mixing employed in mixing the clay and the water. For purposes of clarity, clay dispersion shall be understood to mean the mixture of the clay or clays and water immediately after mixing, and clay slurry shall be understood to mean the mixture of clay or clays and water after the swelling clay has completed at least about 50 percent of its swelling.

The novel compositions may also contain additional kaolin type clay and/or a small amount of starch, as well as stabilizers, viscosity control agents and other additives of the type well known to those skilled in the art.

In general it is desirable to maintain a viscosity of about 20–100 poise (model LVF Brookfield Viscosimeter, using Spindle No. 3 at 30 rmp and/or 12 rpm), though the upper limit is by no means critical. The adhesive compositions are thixotropic, thereby imparting a very high viscosity to the composition during periods of low shear (e.g., storage), and significantly lower viscosity on the application of shear, as during application of the adhesive to media. As compared to previously known dextrin-silicate compositions which had shelf lives measured at best in hours, the compositions of the present invention have been found to be free from any substantial or objectionable floating out after periods in excess of several months.

The higher viscosity during storage tends to improve the inherent stability of the dispersion, and prevent floating out, yet the thixotropy of the composition permits the application of relatively thin coatings under shear. Also, on removal of the shear, the viscosity again quickly increases, preventing undesired heavy penetration of the adhesive into the media to which it is being applied.

PREFERRED EMBODIMENTS

The preferred adhesive compositions of the present invention comprise from 80–92 percent sodium silicate, from 2.0 to 5.0 percent borated dextrin and from 4.5 to 12 percent of a clay slurry formed by blending about one part of kaolin clay, about one part bentonite clay, and 12 parts of water.

The following example will demonstrate by way of illustration and not by way of limitation one of the preferred compositions of the present invention, and the method of its preparation.

EXAMPLE 1

A clay slurry was prepared by blending 1 part of Barden (Kaolin) clay, 1 part of bentonite clay, and 12 parts of water. Seven parts of the clay slurry were then charged into a mixing vessel with 88.5 parts of Diamond Shamrock Silicate Grade 47, a sodium silicate having a $SiO_2$ to $Na_2O$ weight ratio of 2.84 and the mixture was heated to a temperature of 165°F. with constant stirring using a Mark 1 VG Cowles Dissolver (equipped with a 4-inch blade and operated at 2,000 rpm). When the temperature of the mixture had reached 165°F., 4.5 parts of Koldex 30 (a borated dextrin containing less about 15 percent by weight borax) was added, and the mixture was maintained with the agitation at 165°F. for 15 minutes, then allowed to cool to a temperature of about 115°F., at which point the mixture was pumped to storage.

The adhesive composition of Example 1 was found to develop tack in about 15 seconds, as opposed to 30–60 seconds for a typical silicate adhesive, and about 8–10 seconds for a typical dextrin adhesive. It was also found to have an open time of about 40–45 seconds, as compared with 15–20 seconds for silicate adhesives, and 60–90 seconds for dextrin adhesives. In general, silicate adhesives are usually employed in commercial equipment at a temperature of 70°–90°F., whereas dextrin type adhesives can be employed at temperatures from 70°–140°F. The adhesive composition of Example 1 was found to have an even broader operating range. The operating range was found to be 60° to 140°F.

The adhesive of Example 1 was tested in a variety of paper converting operations, box sealing operations, and the like. It was also found to be useful in a wide variety of other areas where water-based adhesives are commonly found to be useful, including use as a binder for aggregate, treatment of concrete, and the like.

The mixing procedure used in Example 1 was subsequently found to be rather critical. While some variation in temperature is possible, the lower temperature limit of about 160°F. was found to be critical. The holding time at the mixing temperature (over and above the stated minimum of 10 minutes) while not critical per se, was found to have an effect on the final viscosity. The higher the temperature, and/or the longer the holding time, and/or the higher the shear applied during mixing, the higher the viscosity generally tends to be. On the other hand, some minor modification in the mixing procedure, such as withholding a portion of the silicate (up to about 35 percent) until after the addition of the dextrin, has been found to be feasible.

The alkali metal silicate used in the composition of this invention is preferably an aqueous sodium silicate (water glass). Its solids content is desirably about 25–55 percent, and the weight ratio of silica to sodium oxide may be between 1.5:1 and 5.0:1, preferably between 2.5:1 and 3.5:1. Typical sodium silicates which may be used include those listed in the following table and manufactured by the Diamond Shamrock Corporation.

TABLE 1

| Silicate grade | $Na_2O$ | $SiO_2$ | Solids content, percent | $SiO_2:Na_2O$, wt. ratio | Gravity, °Be. | Viscosity at 20 °C centipoises |
|---|---|---|---|---|---|---|
| 33 | 8.8 | 29.1 | 37.9 | 3.30 | 41.0 | 303 |
| 40 | 9.1 | 29.2 | 38.3 | 3.22 | 41.5 | 206 |
| 42 | 9.3 | 30.0 | 39.3 | 3.22 | 42.5 | 385 |
| 42 water, white | 10.6 | 26.9 | 37.5 | 2.54 | 42.0 | 63 |
| 45 | 10.3 | 30.9 | 41.2 | 3.00 | 44.6 | 410 |
| 47 | 11.2 | 31.9 | 43.1 | 2.84 | 47.0 | 690 |
| JW–25 | 10.6 | 26.9 | 37.5 | 2.54 | 42.0 | 63 |
| 49–FG | 12.4 | 32.1 | 44.5 | 2.58 | 49.0 | 630 |

The borated dextrin which is the second major ingredient of the composition of this invention has a borax content of from about 1 to 30 percent, by weight, and is formed, for example, by adding from 1 to 30 percent, on a dextrin basis, of an alkali metal borate to an aqueous dispersion of dextrin. Suitable methods for its preparation are disclosed, for example, in U.S. Pat. Nos. 604,584 and 2,849,327. Dextrin, or dextrine, is a colloidal mixture formed by the hydrolysis of starch.

Several attempts were made to produce compositions similar to those of Example 1, but using only a kaolin type clay, and in every instance the dextrin floated out. Likewise, attempts were made to add the swelling clay directly to the sodium silicate, without first dispersing it in the water, and allowing it to swell and form the clay slurry. In these experiments also, the dextrin floated out and the adhesive exhibited no substantially better stability than those of the prior art. Subsequent experiments indicated that the best results were generally obtained with compositions similar to those described in Example 1, where the clay slurry was prepared from approximately equal parts of kaolin and swelling type clay, and where the overall clay content of the final adhesive composition was about 1 percent, or about 0.5 percent swelling type clay and about 0.5 percent kaolin type clay. In those compositions where only a swelling type clay was employed, the final adhesive was as good, but the slurry was a little more difficult to handle during mixing.

It will of course be obvious that many other changes, modifications and alterations can be made in the compositions and methods herein described without departing from the scope of the invention herein disclosed.

I claim:

1. The method of producing a dextrin-clay-silicate adhesive, the steps comprising blending from about 0.25 to about 1.0 parts by weight of a western bentonite clay, from 0 to about 1.0 parts by weight of a kaolin clay, and 6 parts by weight of water to form a clay slurry; mixing about 4.5 to about 12 parts by weight of said clay slurry and from about 80 to about 92 parts by weight of an aqueous alkali metal silicate to form a mixture; heating said mixture with agitation to a temperature of at least 160°F., and while maintaining said mixture at said temperature adding from about 1.5 to about 6 parts by weight dextrin; and holding said mixture at said temperature for a period of at least 10 minutes to produce a stable dispersion having a viscosity of from about 20 to about 100 poise.

2. The product produced by the process of claim 1.

* * * * *